United States Patent
Ohno et al.

(10) Patent No.: US 9,308,935 B2
(45) Date of Patent: Apr. 12, 2016

(54) ELECTRIC POWER STEERING APPARATUS

(71) Applicant: HONDA MOTOR CO., LTD., Minato-Ku, Tokyo (JP)

(72) Inventors: Satoshi Ohno, Wako (JP); Yoshihiro Oniwa, Wako (JP); Atsuhiko Yoneda, Wako (JP); Yasuo Shimizu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/553,360

(22) Filed: Nov. 25, 2014

(65) Prior Publication Data

US 2015/0144418 A1 May 28, 2015

(30) Foreign Application Priority Data

Nov. 27, 2013 (JP) ................................ 2013-244584
Nov. 19, 2014 (JP) ................................ 2014-234518

(51) Int. Cl.
| | |
|---|---|
| B62D 6/08 | (2006.01) |
| B62D 5/04 | (2006.01) |
| B62D 6/00 | (2006.01) |
| B62D 15/02 | (2006.01) |

(52) U.S. Cl.
CPC ............. *B62D 5/0466* (2013.01); *B62D 6/008* (2013.01); *B62D 15/0215* (2013.01)

(58) Field of Classification Search
CPC ... B62D 5/0466; B62D 6/008; B62D 15/0215
See application file for complete search history.

(56) References Cited

U.S. PATENT DOCUMENTS

| | | | | |
|---|---|---|---|---|
| 5,978,721 A | * | 11/1999 | Kagawa ............... | B62D 5/0466 180/443 |
| 2009/0157261 A1 | * | 6/2009 | Yamazaki ............ | B62D 5/0466 701/42 |
| 2009/0266641 A1 | * | 10/2009 | Ehara .................. | B62D 5/0466 180/446 |
| 2010/0121531 A1 | * | 5/2010 | Oniwa ................. | B62D 5/0463 701/41 |
| 2012/0199414 A1 | | 8/2012 | Shimizu et al. | |
| 2012/0232759 A1 | * | 9/2012 | Oniwa ................. | B62D 5/0463 701/41 |
| 2012/0245797 A1 | * | 9/2012 | Ono ....................... | B62D 6/008 701/42 |
| 2015/0012180 A1 | * | 1/2015 | Hayashi ................ | B62D 6/003 701/41 |

FOREIGN PATENT DOCUMENTS

| | | |
|---|---|---|
| JP | 2003-327139 A | 11/2003 |
| JP | 2012-162210 A | 8/2012 |

* cited by examiner

*Primary Examiner* — Kevin Hurley
*Assistant Examiner* — Gabriela C Craciun
(74) *Attorney, Agent, or Firm* — Carrier Blackman & Associates, P.C.; William D. Blackman; Joseph P. Carrier

(57) ABSTRACT

Provided is an electric power steering apparatus capable of performing steering of a steering wheel with a comfortable steering feeling while stabilizing a vehicle behavior even in a vicinity of a steering neutral position. A first electric power steering apparatus includes a steering torque sensor for detecting a steering torque inputted by a driver, a steering angle sensor for detecting a steering angle of a steering wheel, a steering assist motor for applying a steering assist force to the steering wheel, and a drive control unit for performing drive control of the steering assist motor based on the steering torque and the steering angle. The drive control unit performs drive control of the steering assist motor based on the steering angle detected by the steering angle sensor and hysteresis characteristics related to a steering reaction force associated with a change of the steering angle.

16 Claims, 5 Drawing Sheets

ELECTRIC POWER STEERING APPARATUS

CROSS REFERENCE TO RELATED APPLICATIONS

This application claims the foreign priority benefit under Title 35, United States Code, 119(a)-(d) of Japanese Patent Application No. 2013-244584 filed on Nov. 27, 2013 and Japanese Patent Application No. 2014-234518 filed on Nov. 19, 2014 in the Japan Patent Office, each disclosure of which is herein incorporated by reference in its entirety.

BACKGROUND OF THE INVENTION

1. Field of the Invention

The present invention relates to an electric power steering apparatus for applying a steering assist force to a steering member operated by a driver by driving a steering assist motor.

2. Description of the Related Art

Conventionally, in order to reduce a physical burden when the driver steers the steering member such as a steering wheel, there has been known a power steering apparatus for applying the steering assist force to the steering member operated by the driver by driving the steering assist motor.

In the power steering apparatus according to Japanese Patent Application Publication No. 2012-162210, a motor control means includes a first control means for controlling a steering torque detected by a steering torque sensor to be a first predetermined value (for example, zero), and a second control means for controlling the steering torque detected by the steering torque sensor to be a second predetermined value which is greater than the first predetermined value based on a steering angle detected by a steering angle sensor. The motor control means controls driving of the steering assist motor based on an output of the first control means and an output of the second control means.

With the power steering apparatus according to Japanese Patent Application Publication No. 2012-162210, it is possible to reduce the number of development steps of the apparatus while preventing deterioration of steering feeling.

SUMMARY OF THE INVENTION

However, in the power steering apparatus according to Patent Document 1, there is no disclosure or suggestion for positively imparting hysteresis characteristics, in which a locus at the time of additional change of a steering angle and a locus at the time of change back of the steering angle are different from each other, to a steering reaction force characteristics associated with a change of the steering angle in a case where the steering angle is additionally changed or changed back. Therefore, in the power steering apparatus according to Patent Document 1, there has been a possibility that in a vicinity of a steering neutral position, a steering feeling is deteriorated and a vehicle behavior is not stabilized, to give an uncomfortable feeling to the driver.

The present invention has been made to solve the problem, and an object of the present invention is to provide an electric power steering apparatus capable of performing steering of the steering member with a comfortable steering feeling while stabilizing the vehicle behavior even in the vicinity of the steering neutral position.

Solution to Problem

In order to achieve the above purpose, the present invention according to claim 1 provides an electric power steering apparatus including a steering member which is operated by a driver when turning a turning wheel of a vehicle, a steering torque detector for detecting a steering torque which is inputted by the driver to a steering shaft attached to the steering member based on torsion information of a torsion bar portion constituting at least a part of the steering shaft, a steering angle detector for detecting a steering angle of the steering member, a steering assist motor for applying a steering assist force to the steering member via the steering shaft in order to adjust the steering torque inputted by the driver, and a drive control unit for performing drive control of the steering assist motor based on at least the steering torque detected by the steering torque detector and the steering angle detected by the steering angle detector.

The drive control unit includes a steering reaction force characteristics storage unit for storing hysteresis characteristics related to a steering reaction force which is generated by driving the steering assist motor and is associated with a change of the steering angle in a case where the steering angle is additionally changed or changed back, and performs drive control of the steering assist motor based on the steering angle and the hysteresis characteristics stored in the steering reaction force characteristics storage unit.

In the present invention according to claim 1, since the drive control unit performs drive control of the steering assist motor based on the steering angle and the hysteresis characteristics stored in the steering reaction force characteristics storage unit, the steering reaction force having characteristics contributing to stability of the vehicle behavior is given even in a vicinity of a steering neutral position. As a result, it is possible to perform steering of the steering member with a comfortable steering feeling while stabilizing the vehicle behavior.

However, even in a case of setting hysteresis characteristics related to the steering reaction force as described above, for example, in a case where a torsional rigidity of the torsion bar portion is lower than a reference threshold value for maintaining stable running of the vehicle, there remains a possibility of leading to a situation in which a steering direction of the steering member and a turning direction of the turning wheel are opposite to each other (do not match each other).

In order to remove the possibility, in the present invention according to claim 1, the steering angle detector is provided on a side of the turning wheel relative to the steering torque detector (torsion bar portion). In this case, whereas the turning wheel tends to be difficult to move, movement difficulty of the steering member is reduced compared to the turning wheel, because the torsional rigidity of the torsion bar portion is lower than the reference threshold value.

Therefore, in the present invention according to claim 1, even in a case where the torsional rigidity of the torsion bar portion is lower than the reference threshold value, it is possible to avoid in advance a situation in which the steering direction of the steering member and the turning direction of the turning wheel are opposite to each other (do not match each other). Therefore, it is possible to perform steering of the steering member with a comfortable steering feeling while stabilizing the vehicle behavior.

In the present invention according to claim 1, in a case where the hysteresis characteristics related to the steering reaction force is set and the torsional rigidity of the torsion bar portion is lower than the reference threshold value, in order to remove the possibility of leading to the situation in which the steering direction of the steering member and the turning direction of the turning wheel do not match each other, it is configured such that the steering angle detector is provided on the side of the turning wheel relative to the steering torque detector (torsional bar portion).

However, for example, due to layout constraints or the like, there is also assumed a case where it is not possible to employ a configuration of the present invention according to claim 1, but it cannot help employing a configuration in which the steering angle detector is provided on a side of the steering member relative to the steering torque detector (torsion bar portion). Also in such a case, it is strongly required to ensure comfort of the steering feeling and stabilization of the vehicle behavior.

From this aspect, as with the present invention according to claim 1, the present invention according to claim 2 provides an electric power steering apparatus including a steering member which is operated by a driver when turning a turning wheel of a vehicle, a steering torque detector for detecting a steering torque which is inputted by the driver to a steering shaft attached to the steering member based on torsion information of a torsion bar portion constituting at least a part of the steering shaft, a steering angle detector for detecting a steering angle of the steering member, a steering assist motor for applying a steering assist force to the steering member via the steering shaft in order to adjust the steering torque inputted by the driver, and a drive control unit for performing drive control of the steering assist motor based on at least the steering torque detected by the steering torque detector and the steering angle detected by the steering angle detector.

However, in the present invention according to claim 2, a position where the steering angle detector is provided is different from that in the present invention according to claim 1. That is, in the present invention according to claim 2, the steering angle detector is provided on a side of the steering member relative to a position where the steering torque detector is provided on the steering shaft.

Further, the present invention according to claim 2 provides the electric power steering apparatus further including a steering information processing unit, which estimates a torsion angle of the steering shaft based on a detection result by the steering torque detector, and calculates a correction amount of the steering angle for compensating a torsion amount of the steering shaft based on the estimated torsion angle of the steering shaft, and then calculates a steering angle after a correction for compensating the torsion amount of the steering shaft based on the steering angle detected by the steering angle detector and the calculated correction amount of the steering angle.

The drive control unit includes a steering reaction force characteristics storage unit for storing hysteresis characteristics related to a steering reaction force which is generated by driving the steering assist motor and is associated with a change of the steering angle after the correction in a case where the steering angle is additionally changed or changed back, and performs drive control of the steering assist motor based on the steering angle after the correction and the hysteresis characteristics stored in the steering reaction force characteristics storage unit.

With the present invention according to claim 2, the steering angle detector is provided on the side of the steering member relative to the position where the steering torque detector (torsion bar portion) is provided on the steering shaft, and the drive control unit performs drive control of the steering assist motor based on the steering angle after the correction and the hysteresis characteristics stored in the steering reaction force characteristics storage unit. Therefore, the steering reaction force having characteristics contributing to stability of the vehicle behavior is given even in the vicinity of the steering neutral position. As a result, even in a case where the configuration in which the steering angle detector is provided on the side of the steering member relative to the steering torque detector (torsion bar portion) is employed, it is possible to perform steering of the steering member with a comfortable steering feeling while stabilizing the vehicle behavior.

Further, the present invention is the electric power steering apparatus characterized in that in the hysteresis characteristics, the steering reaction force associated with a case where the steering angle is in the neutral position is set to a value other than zero.

According to this invention, in the hysteresis characteristics, the steering reaction force associated with the case where the steering angle is in the neutral position is set to a value other than zero. Therefore, in particular, the steering feeling in the vicinity of the steering neutral position can be improved in addition to operational effects achieved by the above invention.

Further, the present invention is the electric power steering apparatus characterized in that the torsional rigidity of the torsion bar portion is set to high rigidity exceeding a reference threshold value for maintaining stable running of the vehicle.

According to this invention, since the torsional rigidity of the torsion bar portion is set to high rigidity exceeding the reference threshold value for maintaining stable running of the vehicle, it is possible to reliably remove the possibility of leading to the situation in which the steering direction of the steering member and the turning direction of the turning wheel do not match each other. As a result, it is possible to perform steering of the steering member more accurately with a comfortable steering feeling while stabilizing the vehicle behavior.

Furthermore, the present invention is the electric power steering apparatus characterized in that the steering torque detector is composed of a magnetostrictive torque sensor which is provided on the torsion bar portion to detect the steering torque inputted by the driver without touching the torsion bar portion.

According to this invention, since the magnetostrictive torque sensor is employed as the steering torque detector, the torsional rigidity of the torsion bar portion can be set to be larger than that of a torque sensor of a so-called torsion bar type. As a result, it is possible to achieve an effect of performing steering of the steering member at a high level with a comfortable steering feeling while stabilizing the vehicle behavior.

With the electric power steering apparatus according to the present invention, it is possible to perform steering of the steering member with a comfortable steering feeling while stabilizing the vehicle behavior even in the vicinity of the steering neutral position.

DETAILED DESCRIPTION OF THE INVENTION

Figure 1:
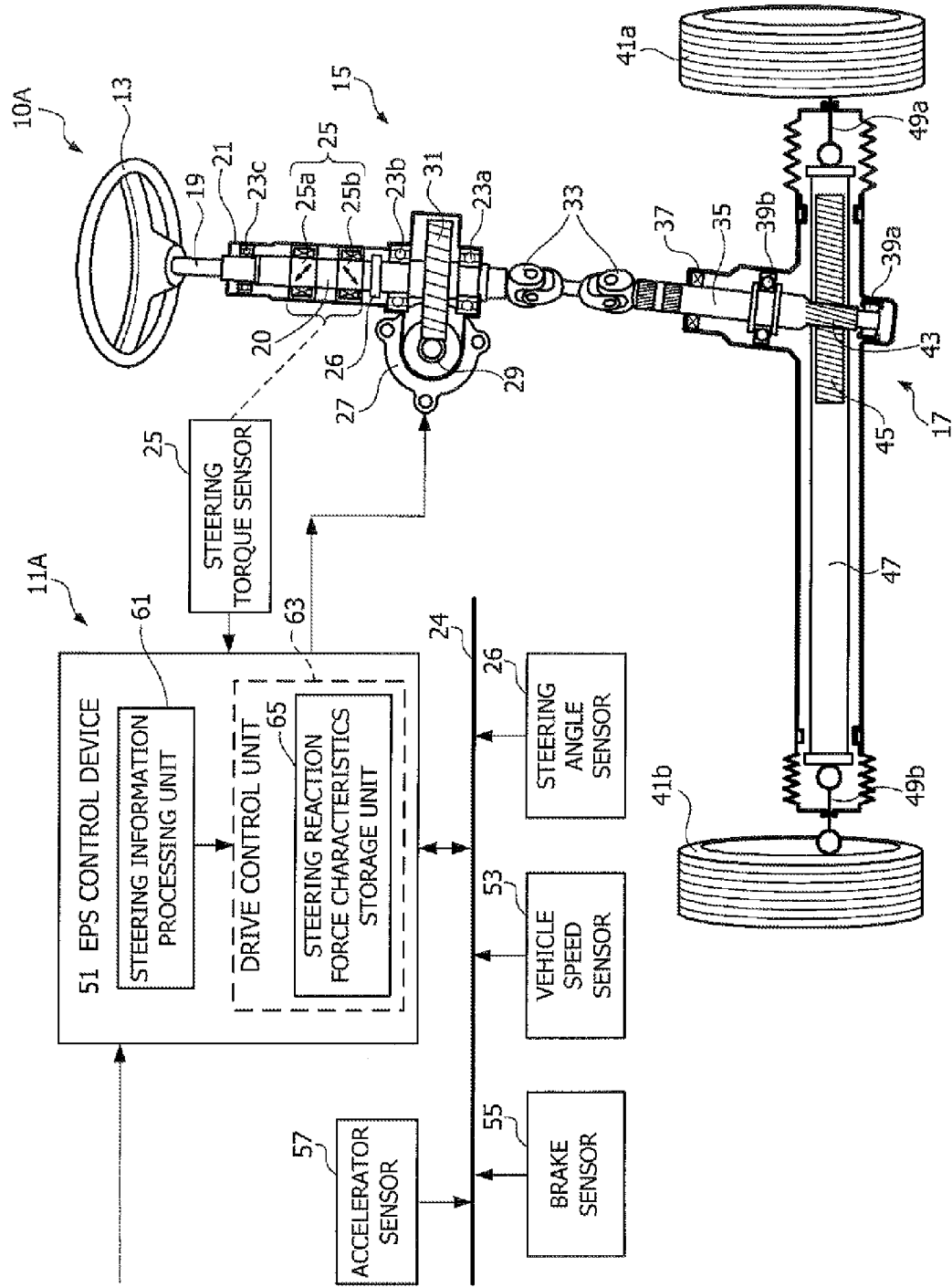
FIG. 1 is a block diagram of an electric power steering apparatus including a peripheral portion thereof according to a first embodiment of the present invention.

In the followings, electric power steering apparatuses according to a plurality of embodiments of the present invention will be described in detail with reference to the accompanying drawings. Note that, in the drawings shown below, members having a common function or members having functions corresponding to each other are denoted by a common reference numeral as a rule. Further, for convenience of description, a shape or size of a member may be schematically shown by deformation or exaggeration.

[Configuration of a First Steering Apparatus 10A in Coordination with a First Electric Power Steering Apparatus 11A]

First, a first electric power steering apparatus 11A according to a first embodiment of the present invention will be described. However, prior to the description of the first electric power steering apparatus 11A, a configuration of a first steering apparatus 10A in coordination with the first electric power steering apparatus 11A will be described. FIG. 1 is a block diagram of the first electric power steering apparatus 11A including a peripheral portion thereof according to the first embodiment of the present invention.

As shown in FIG. 1, the first steering apparatus 10A includes a steering wheel 13, a steering assist device 15, and a turning device 17.

The steering wheel 13 corresponding to "steering member" of the present invention is a member which is operated when a driver is going to change a traveling direction of a vehicle (not shown) to a desired direction. One end portion of a steering shaft 19 is connected to the center of the steering wheel 13. The steering shaft 19 is rotatably supported by an upper housing 21 via bearings 23a, 23b, and 23c which are respectively provided on a lower portion, an intermediate portion, and an upper portion in the upper housing 21.

Inside the housing 21, a magnetostrictive steering torque sensor (corresponding to "steering torque detector" of the present invention) 25 is provided so as to surround a torsion bar portion 20 of the steering shaft 19. The torsion bar portion 20 constitutes a part of the steering torque sensor 25. On the steering shaft 19, a magnetostrictive film (not shown) made of, for example, Ni—Fe plating is provided so as to cover the entire circumference in the circumferential direction of the torsion bar portion 20. The steering torque sensor 25 has a function of detecting a magnitude of a steering torque which is inputted to the torsion bar portion 20 of the steering shaft 19 via the steering wheel 13 without contacting the steering shaft 19, for example, by using first and second coils 25a, 25b of solenoid type.

Here, the detection principle of the steering torque in the magnetostrictive steering torque sensor 25 will be described. When the steering torque is inputted to the torsion bar portion 20 of the steering shaft 19, a torsion occurs in the torsion bar portion 20, to generate strains in a tensile direction (+45° direction) and in a compression direction (−45° direction) in a surface of the torsion bar portion 20. In this case, while a magnetic permeability is increased in the tensile direction, the magnetic permeability is reduced in the compression direction. This phenomenon is referred to as a magnetostrictive effect. By obtaining information of a change of the magnetic permeability generated by the magnetostrictive effect (corresponding to "torsion information of a torsion bar portion" of the present invention), it is possible to detect a correlation value of the steering torque. Therefore, a first coil 25a is provided so that a magnetic flux passes in a direction in which the magnetic permeability is increased. On the other hand, a second coil 25b is provided so that the magnetic flux passes in a direction in which the magnetic permeability is reduced.

Then, while an inductance is increased in the first coil 25a which is provided so that the magnetic flux passes in the direction in which the magnetic permeability is increased, the inductance is reduced in the second coil 25b which is provided so that the magnetic flux passes in the direction in which the magnetic permeability is reduced. The first coil 25a and the second coil 25b are bridged, so that a differential voltage is amplified to be outputted in a differential amplifier circuit (not shown). In this manner, it is possible to detect an output voltage proportional to the steering torque, that is, the correlation value of the steering torque (a steering torque signal).

The steering torque signal detected by the steering torque sensor 25 is supplied to an electric power steering control device (hereinafter, abbreviated as an EPS control device in some cases) 51 to be described later via a communication medium 24 such as a CAN (Controller Area Network).

Further, on the steering shaft 19, a steering angle sensor (corresponding to "steering angle detector" of the present invention) 26 for detecting a steering angle of the steering wheel 13 is provided. As shown in FIG. 1, the steering angle sensor 26 is provided on a side of turning wheels 41a, 41b to be described later relative to the torsion bar portion 20 constituting a part of the steering torque sensor 25. A steering angle signal detected by the steering angle sensor 26 is supplied to the EPS control device 51 via the communication medium 24.

The steering assist device 15 has a function of applying a steering assist force to the steering wheel 13 operated by the driver. The steering assist device 15 is configured to include a steering assist motor 27 which supplies an assist force (a steering reaction force) for reducing (adjusting) the steering torque of the steering wheel 13 operated by the driver, and a worm wheel gear 31 which meshes with a worm gear 29 provided on an output shaft of the steering assist motor 27.

The worm wheel gear 31 is provided on the other end side of the steering shaft 19 as a rotation center, while the steering wheel 13 is provided on one end side of the steering shaft 19. The worm wheel gear 31 serves to transmit a rotational force of the steering assist motor 27 to the steering wheel 13 via the steering shaft 19 as well as to the turning wheels 41a, 41b via the turning device 17.

A torsional rigidity of the torsion bar portion 20 is set to high rigidity exceeding a reference threshold value for maintaining stable running of the vehicle. As the reference threshold value of the torsional rigidity of the torsion bar portion 20, an appropriate value is, for example, set through experiments using an actual vehicle, simulations without using the actual vehicle, or the like. Specifically, for example, 560 Nm/rad can be employed as the reference threshold value, although it is not limited thereto.

To the other end of the steering shaft 19, a pinion shaft 35 is connected via a pair of universal joints 33 in series. The pinion shaft 35 is rotatably supported by a lower housing 37 via bearings 39a, 39b which are respectively provided on a lower portion and an intermediate portion of the lower housing 37.

The turning device 17 has a function of transmitting a steering force (steering torque) inputted by the driver via the steering wheel 13 and the steering shaft 19 to the turning wheels 41a, 41b. The turning device 17 is configured to include a pinion gear 43 provided on the pinion shaft 35, a rack shaft 47 which has rack teeth 45 meshing with the pinion gear 43 and is reciprocable in a vehicle width direction, tie rods 49a, 49b respectively provided on both end sides of the rack shaft 47, and the turning wheels 41a, 41b which are rotatably provided respectively via the tie rods 49a, 49b.

[Configuration of the First Electric Power Steering Apparatus 11A]

Next, a configuration of the first electric power steering apparatus 11A will be described with reference to FIG. 1. The first electric power steering apparatus 11A is configured to include the steering assist device 15 and the EPS control device 51. The EPS control device 51 is connected to the communication medium 24. To the communication medium 24, in addition to the steering torque sensor 25 and the steering angle sensor 26, a vehicle speed sensor 53 for detecting a speed (vehicle speed) of an own vehicle, a brake sensor 55 for detecting a depression stroke of a brake pedal (not shown), and an accelerator sensor 57 for detecting a depression stroke of an accelerator pedal (not shown) are connected.

(Configuration of the EPS Control Device 51)

The EPS control device 51 has a function of controlling the steering assist force, which is generated to be applied to the steering wheel 13 by the electric power steering apparatus 11A, with reference to various signals such as the steering torque signal detected by the steering torque sensor 25, the steering angle signal detected by the steering angle sensor 26, and a vehicle speed signal detected by the vehicle speed sensor 53. The EPS control device 51 is configured to include a microcomputer for performing arithmetic processing and various peripheral circuits including a drive control circuit for the steering assist motor 27.

Describing in detail, the EPS control device 51 includes a steering information processing unit 61 and a drive control unit 63.

The steering information processing unit 61 has a function of performing a processing required for steering information including the steering torque detected by the steering torque sensor 25 and the steering angle detected by the steering angle sensor 26. Specifically, the steering information processing unit 61 performs arithmetic processing of time differential on information of steering angle θh, which varies time to time and is detected by the steering angle sensor 26, and outputs the time differential value dθh/dt. The time differential value dθh/dt is transmitted to the drive control unit 63.

Figure 3:
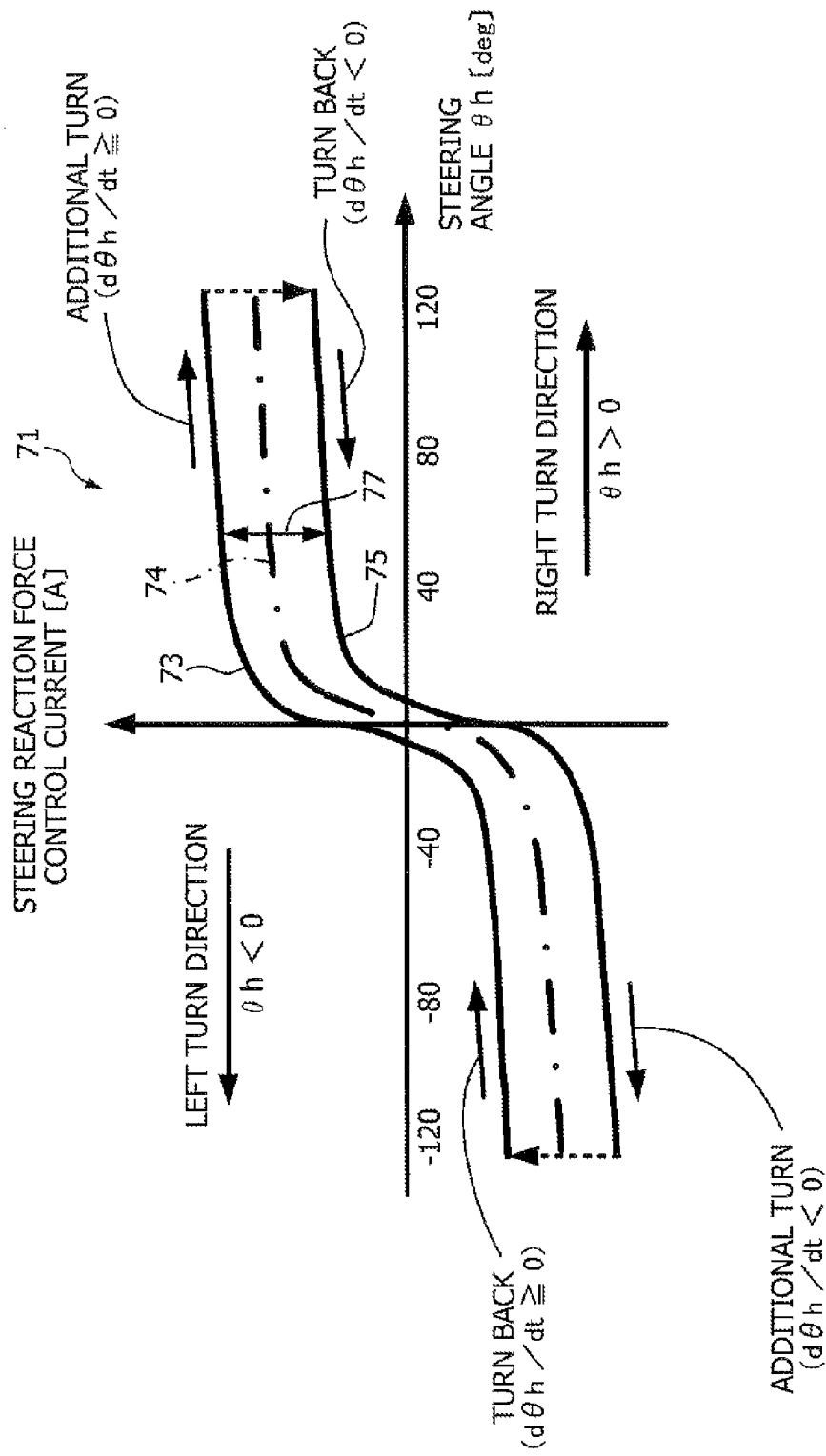
FIG. 3 is a hysteresis characteristic diagram for describing the operation of the electric power steering apparatus according to the first embodiment of the present invention, and for exemplarily illustrating a change of steering reaction force (steering reaction force control current) associated with a change of a steering angle of a steering wheel.

The steering angle and the time differential value dθh/dt are referred when the drive control unit 63 determines a current steering situation of the steering wheel 13 (whether the steering wheel 13 is steered in a right turn direction or in a left turn direction, and whether the steering wheel 13 is additionally turned or turned back), for example, as shown in FIG. 3 and Table 1, and calculates the steering reaction force (steering reaction force control current) corresponding to the steering angle in the determined current steering situation based on hysteresis characteristics to be described later.

TABLE 1

|  | dθh/dt ≥ 0 | dθh/dt < 0 |
| --- | --- | --- |
| θh > 0 (right turn direction) | additional turn | turn back |
| θh < 0 (left turn direction) | turn back | additional turn |

The drive control unit 63 has a function of performing drive control of the steering assist motor 27 based on at least the steering torque detected by the steering torque sensor 25 and the steering angle detected by the steering angle sensor 26. Further, the drive control unit 63 includes a steering reaction force characteristics storage unit 65.

The steering reaction force characteristics storage unit 65 of the drive control unit 63 stores the hysteresis characteristics in which a locus at the time of additional change of a steering angle and a locus at the time of change back of the steering angle are different from each other, for example, as shown in FIG. 3. The hysteresis characteristics is related to the steering reaction force which is generated by driving the steering assist motor 27 and is associated with a change of the steering angle in a case where the steering angle θh is additionally changed (operation of leaving a neutral position of the steering wheel 13) or changed back (operation of approaching the neutral position of the steering wheel 13).

A hysteresis characteristic diagram 71 shown in FIG. 3 includes a first characteristic diagram 73 and a second characteristic diagram 75. As shown in FIG. 3, the first characteristic diagram 73 has a positional relationship shifted in parallel by a predetermined hysteresis width 77 in the vertical axis (steering reaction force control current) direction with respect to the second characteristic diagram 75.

The first characteristic diagram 73 is formed by connecting a characteristic diagram when the steering wheel 13 is additionally turned in the right turn direction and a characteristic diagram when the steering wheel 13 is turned back in the left turn direction with each other in the neutral position (where the steering angle is zero) of the steering wheel 13.

On the other hand, the second characteristic diagram 75 is formed by connecting a characteristic diagram when the steering wheel 13 is additionally turned in the left turn direction and a characteristic diagram when the steering wheel 13 is turned back in the right turn direction with each other in the neutral position (where the steering angle is zero) of the steering wheel 13.

In the hysteresis diagram 71 shown in FIG. 3, a value other than zero is stored for the steering reaction force (steering reaction force control current) corresponding to a case where the steering angle θh is in the neutral position. The hysteresis characteristics stored in the steering reaction force characteristics storage unit 65 is referenced when the drive control unit 63 performs drive control of the steering assist motor 27.

[Operation of the First Electric Power Steering Device 11A]

Figure 2:
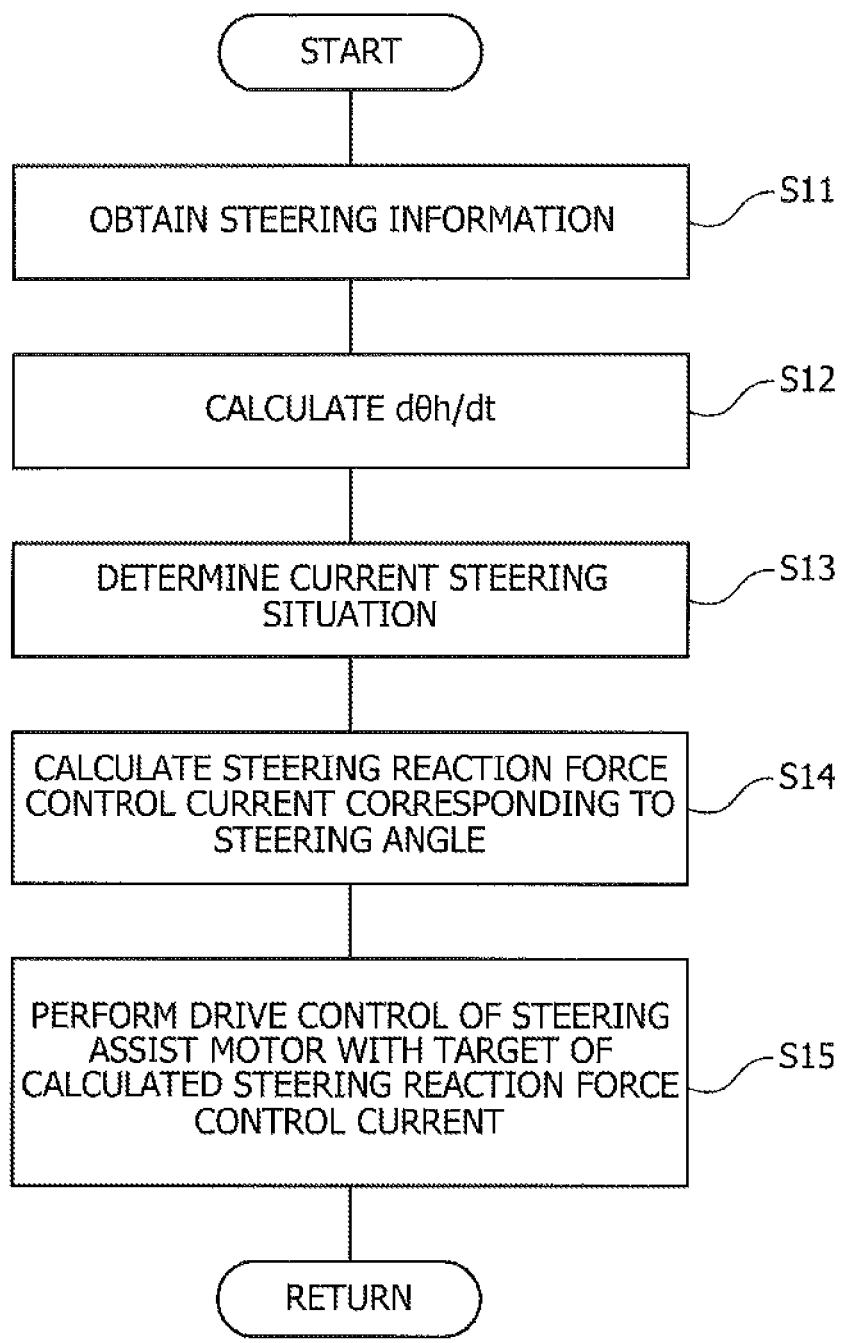
FIG. 2 is a flow chart for describing an operation of the electric power steering apparatus according to the first embodiment of the present invention.

Next, an operation of the first electric power steering device 11A according to the first embodiment of the present invention will be described with reference to FIG. 2. FIG. 2 is a flow chart for describing the operation of the electric power steering apparatus according to the first embodiment of the present invention.

In Step S11 shown in FIG. 2, the steering information processing unit 61 obtains the steering information including the steering torque detected by the steering torque sensor 25 and the steering angle detected by the steering angle sensor 26.

In Step S12, the steering information processing unit 61 performs operation of time differential on information of steering angle θh which is detected time to time by the steering angle sensor 26. The time differential value dθh/dt, which is calculated by the steering information processing unit 61, is transmitted to the drive control unit 63.

In Step S13, the drive control unit 63 determines the current steering situation of the steering wheel 13 (whether the steering wheel 13 is steered in the right turn direction or in the left turn direction, and whether the steering wheel 13 is additionally turned or turned back) based on information of steering angle θh obtained in Step S11 and the time differential value dθh/dt calculated in Step S12.

In Step S14, the drive control unit 63 calculates the steering reaction force (steering reaction force control current) corresponding to the steering angle θh in the current steering situation determined in Step S13 with reference to the hysteresis characteristics stored in the steering reaction force characteristics storage unit 65.

In Step S15, the drive control unit 63 performs drive control (Proportional Integral Derivative Controller) of the steering assist motor 27 with a target of the steering reaction force (steering reaction force control current) corresponding to the current steering angle θh calculated in Step S13. Then, the EPS control device 51 returns a flow of the processing to Step S11, to repeatedly perform the processing described above.

[Operational Effects Achieved by the First Electric Power Steering Apparatus 11A]

Next, operational effects achieved by the first electric power steering apparatus 11A will be described.

When the driver steers the steering wheel 13, the steering force is sequentially transmitted to the steering shaft 19 (including torsion bar portion 20), the pair of universal joints 33, the pinion shaft 35, the pinion gear 43, the rack shaft 47 having the rack teeth 45, and the tie rods 49a, 49b. As a result, the turning wheels 41a, 41b on the left and right are turned.

When the driver steers the steering wheel 13, the steering torque inputted by the driver to the steering shaft 19 is detected by the magnetostrictive steering torque sensor 25 which is provided around the torsion bar portion 20 of the steering shaft 19. The EPS control device 51 performs drive control of the steering assist motor 27 so as to reduce or adjust a physical burden of the driver due to the steering torque in response to the steering torque detected by the steering torque sensor 25.

A torque of the steering reaction force generated by driving the steering assist motor 27 is transmitted to the steering shaft 19 via the worm gear 29 and the worm wheel gear 31, and is also transmitted to the pinion shaft 35. As a result, the steering force (steering torque) of the steering wheel 13 operated by the driver is properly adjusted by the assist force (steering reaction force) of the steering assist motor 27.

In a case where the torsional rigidity of the torsion bar portion 20 is relatively low, such as less than half of the reference threshold value (for example, in a case where a steering torque sensor of a torsion bar type is employed), there is a possibility that the rotational force of the steering assist motor 27 is transmitted to the turning wheels 41a, 41b in a direction quite opposite to a steering direction of the steering wheel 13 by the driver. In such a case, there has been a possibility that in a vicinity of a steering neutral position, a steering feeling is deteriorated and a vehicle behavior is not stabilized, to give an uncomfortable feeling to the driver.

A mechanism of action in which a reverse phenomenon occurs between the steering direction and a turning direction will be described with an example in which the hysteresis characteristics related to the steering reaction force generated by driving the steering assist motor 27 is not set for the change of the steering angle in the vicinity of the steering neutral position (a locus at the time of additional turn and a locus at the time of turn back are common with each other and the locus of the steering reaction force in the vicinity of the steering neutral position passes through the origin: for example, refer to the characteristic diagram 74 shown by a one dot chain line in FIG. 3).

As described above, in the case where the torsional rigidity of the torsion bar portion 20 is low and the hysteresis characteristics, in which a locus at the time of additional turn and a locus at the time of turn back are different from each other (for example, refer to the hysteresis characteristic diagram 71 shown by a solid line in FIG. 3), is not set, there has been a problem that the steering and the vehicle behavior are not stabilized in the vicinity of the steering neutral position.

Therefore, the first electric power steering apparatus 11A based on a first aspect (corresponding to claim 1) employs a configuration in which the drive control unit 63 includes the steering reaction force characteristics storage unit 65 for storing hysteresis characteristics related to the steering reaction force which is generated by driving the steering assist motor 27 and is associated with the change of the steering angle in a case where the steering angle is additionally changed or changed back, and performs drive control of the steering assist motor 27 based on the steering angle and the hysteresis characteristics stored in the steering reaction force characteristics storage unit 65.

According to the first electric power steering apparatus 11A based on the first aspect, since the drive control unit 63 performs drive control of the steering assist motor 27 based on the steering angle and the hysteresis characteristics stored in the steering reaction force characteristics storage unit 65, the steering reaction force having characteristics contributing to stability of the vehicle behavior is given even in the vicinity of the steering neutral position. As a result, it is possible to perform steering of the steering member with a comfortable steering feeling while stabilizing the vehicle behavior.

However, even in a case of setting hysteresis characteristics related to the steering reaction force as described above, in a case where the torsional rigidity of the torsion bar portion 20 constituting at least a part of the steering shaft 19 is, for example, lower than a reference threshold value (for example, about 560 Nm/rad) for maintaining stable running of the vehicle, there remains a possibility of leading to a situation in which the steering direction of the steering wheel 13 and the turning direction of the turning wheels 41a, 41b are opposite to each other (do not match each other).

In order to remove the possibility, in the first electric power steering apparatus 11A based on the first aspect, the steering angle sensor (steering angle detector) 26 is provided on the side of the turning wheels 41a, 41b relative to a position where the steering torque detector 25 (torsion bar portion 20) is provided on the steering shaft 19. In this case, whereas the turning wheels 41a, 41b tend to be difficult to move, movement difficulty of the steering wheel 13 is reduced compared to the turning wheels 41a, 41b, because the torsional rigidity of the torsion bar portion 20 is lower than the reference threshold value.

Therefore, according to the first electric power steering apparatus 11A based on the first aspect, it is possible to avoid in advance a situation in which the steering direction of the steering wheel 13 and the turning direction of the turning wheels 41a, 41b are opposite to each other (do not match each other), thereby performing steering of the steering wheel 13 with a comfortable steering feeling while stabilizing the vehicle behavior.

Further, the first electric power steering apparatus 11A based on a third aspect (corresponding to claim 3) may employ a configuration in which the steering reaction force associated with a case where the steering angle is in a neutral position is set to a value other than zero in the hysteresis characteristics. According to the first electric power steering apparatus 11A based on the third aspect, since the steering reaction force which is associated with a case where the steering angle θh is in the neutral position is set to a value other than zero (for example, see FIG. 3), in particular, the steering feeling in the vicinity of the steering neutral position can be improved in addition to operational effects achieved by the first electric power steering apparatus 11A based on the first aspect.

Further, the first electric power steering apparatus 11A based on a fourth aspect (corresponding to claim 4) may employ a configuration in which the torsional rigidity of the torsion bar portion 20 is set to high rigidity exceeding the reference threshold value for maintaining stable running of the vehicle.

According to the first electric power steering apparatus 11A based on the fourth aspect, since the torsional rigidity of the torsion bar portion 20 is set to high rigidity exceeding the reference threshold value for maintaining stable running of the vehicle, it is possible to reliably remove the possibility of leading to the situation in which the steering direction of the steering member 13 and the turning direction of the turning wheels 41a, 41b are opposite to each other (do not match each other). As a result, it is possible to perform steering of the steering member more accurately with a comfortable steering feeling while stabilizing the vehicle behavior.

Further, the first electric power steering apparatus 11A based on a fifth aspect (corresponding to claim 5) may employ a configuration in which the steering torque sensor (steering torque detector) 25 is composed of a magnetostrictive torque sensor which is provided to detect the steering torque inputted by the driver without touching the steering shaft 19.

According to the first electric power steering apparatus 11A based on the fifth aspect, since the magnetostrictive torque sensor 25 is employed as the steering torque detector, the torsional rigidity of the torsion bar portion 20 can be set to be larger than that of, for example, the torque sensor of the torsion bar type. As a result, it is possible to achieve an effect of performing steering of the steering member at a high level with a comfortable steering feeling while stabilizing the vehicle behavior.

[Configuration of a Second Electric Power Steering Apparatus 11B]

Figure 4:
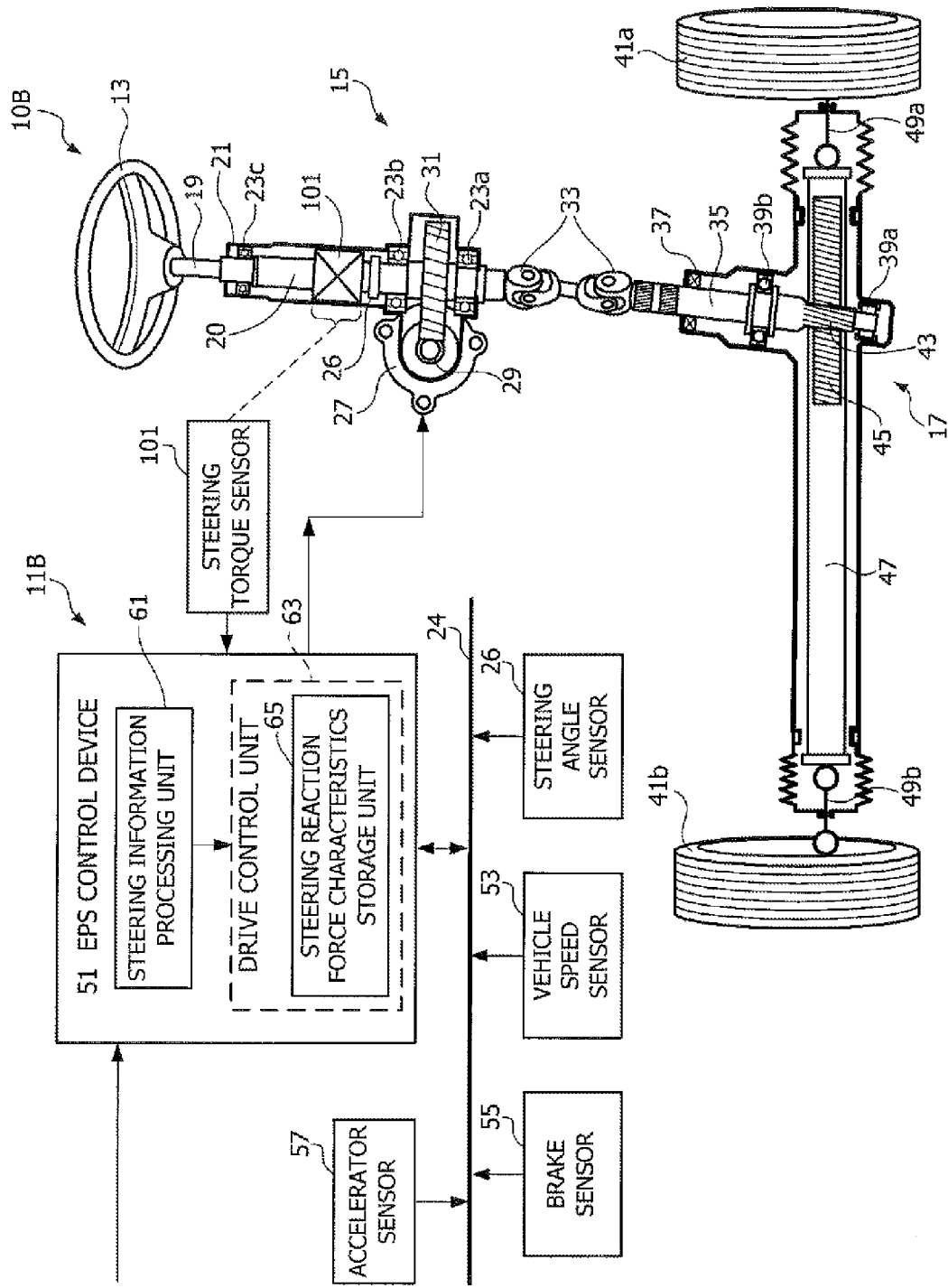
FIG. 4 is a block diagram of an electric power steering apparatus including a peripheral portion thereof according to a second embodiment of the present invention.

Next, a second electric power steering apparatus 11B according to a second embodiment of the present invention will be described with reference to FIG. 4, focusing on differences from the first electric power steering apparatus 11A. FIG. 4 is a block diagram of the second electric power steering apparatus 11A including a peripheral portion thereof according to the second embodiment of the present invention.

The first electric power steering apparatus 11A employs the magnetostrictive steering torque sensor 25 as a steering torque detecting means. In contrast, as shown in FIG. 4, the second electric power steering apparatus 11B employs a steering torque sensor 101 of a torsion bar type as the steering torque detecting means. The steering torque sensor 101 of the torsion bar type detects the steering torque by converting a relative rotation amount between an input side and an output side of the torsion bar portion 20 to a magnitude of the torque.

The steering torque sensor 101 of the torsion bar type may employ, for example, a configuration such as shown in paragraphs [0018] to [0021] of Japanese Patent Application Publication No. 2003-327139. That is, the steering torque sensor 101 of the torsion bar type is provided on the torsion bar portion 20. A torque detector of the steering torque sensor 101 includes a differential transformer and a cylindrical slide member (both not shown) which is slidably attached to around a shaft of the torsion bar portion 20. The slide member is configured to move in an axial direction in proportion to the relative rotation amount between the input side and the output side of the torsion bar portion 20. The differential transformer is operated to output a signal corresponding to the magnitude and direction of the torque, which is applied to the input side of the torsion bar portion 20, by detecting a slide position of the slide member.

[Configuration of a Third Electric Power Steering Apparatus 11C]

Figure 5:
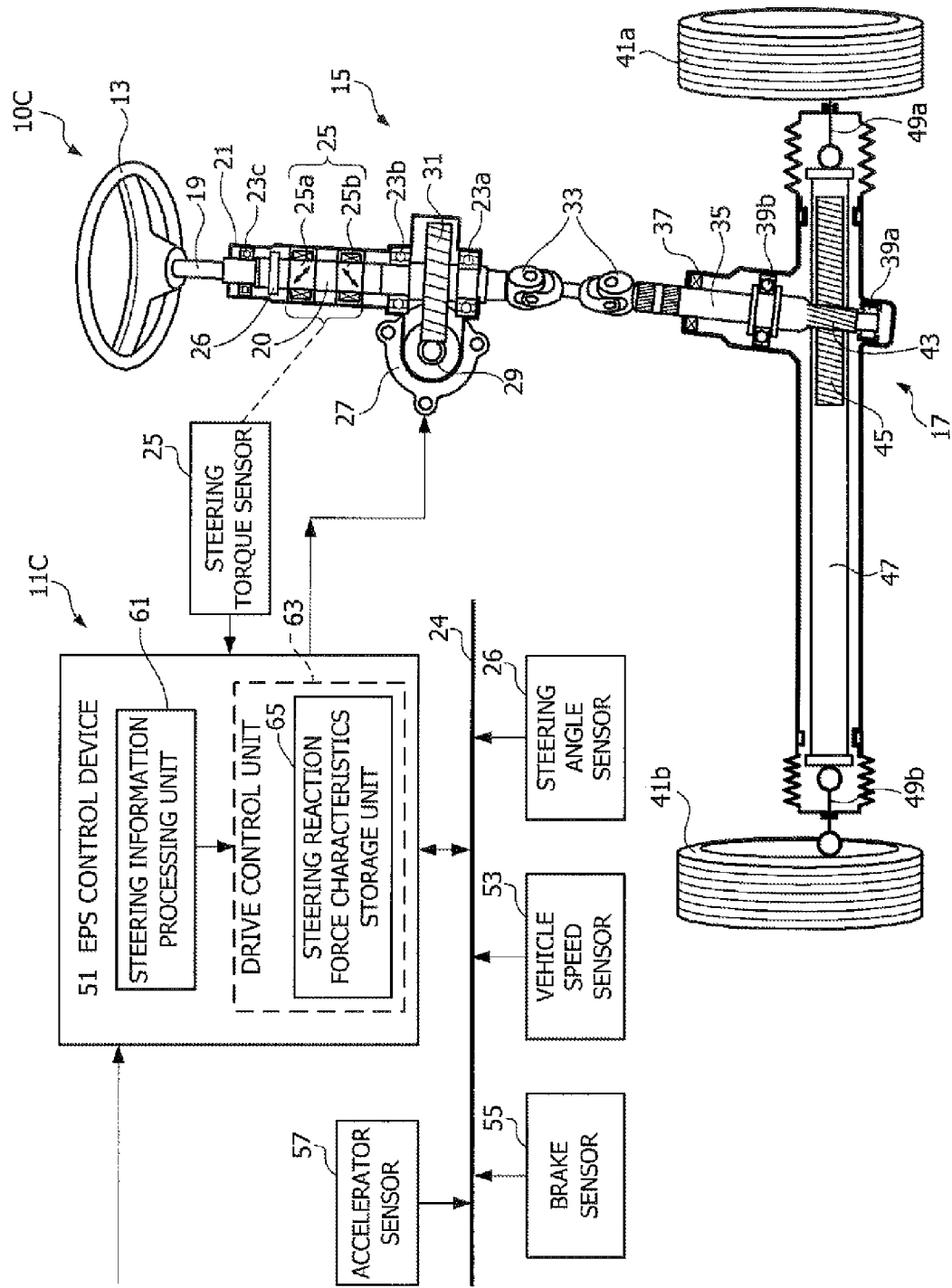
FIG. 5 is a block diagram of an electric power steering apparatus including a peripheral portion thereof according to a third embodiment of the present invention.

Next, the third electric power steering apparatus 11C according to a third embodiment of the present invention will be described with reference to FIG. 5, focusing on differences from the first electric power steering apparatus 11A. FIG. 5 is a block diagram of the third electric power steering apparatus 11C including a peripheral portion thereof according to the third embodiment of the present invention.

In the first electric power steering apparatus 11A, as shown in FIG. 1, the steering angle sensor 26 is provided on the side of the turning wheels 41a, 41b relative to the torsion bar portion 20 constituting a part of the steering torque sensor 25. In contrast, in the third electric power steering apparatus 11C, as shown in FIG. 5, the steering angle sensor 26 is provided on the side of the steering wheel 13 relative to the torsion bar portion 20 constituting the part of the steering torque sensor 25.

Further, in the third electric power steering apparatus 11C, basically as with the first electric power steering apparatus 11A, the steering information processing unit 61 has the function of performing the processing required for the steering information including the steering torque detected by the steering torque sensor 25 and the steering angle detected by the steering angle sensor 26.

However, in the third electric power steering apparatus 11C, the steering information processing unit 61 has a function of estimating the torsion angle of the steering shaft 19 (torsion bar portion 20) based on a detection result by the steering torque detector 25, calculating a correction amount of the steering angle for compensating a torsion amount of the torsion bar portion 20 based on the estimated torsion angle of the torsion bar portion 20, and calculating the steering angle after a correction for compensating the torsion amount of the torsion bar portion 20 based on the steering angle detected by the steering angle detector 26 and the calculated correction amount of the steering angle.

Specifically, the steering angle θg*1 after the correction can be obtained by using the following equations.

$$\Delta \theta hg = Tdet/Ks \quad \text{(Equation 1)}$$

$$\theta g*1 = \theta h - \Delta \theta hg \quad \text{(Equation 2)}$$

Here, Δθhg is the correction amount of the steering angle for compensating the torsion amount of the torsion bar portion 20. Tdet is a detection value of the steering torque detected by the steering torque sensor 25. Ks is the torsional rigidity of the torsion bar portion 20 which can be obtained in advance. θh is a detection value of the steering angle detected by the steering angle sensor 26.

In the third electric power steering apparatus 11C, the drive control unit 63 includes the steering reaction force characteristics storage unit 65 for storing hysteresis characteristics related to the steering reaction force which is generated by driving the steering assist motor 27 and is associated with the change of the steering angle after the correction in the case where the steering angle is additionally changed or changed back, and has a function of performing drive control of the steering assist motor 27 based on the steering angle after the correction and the hysteresis characteristics stored in the steering reaction force characteristics storage unit 65.

[Operational Effects Achieved by the Third Electric Power Steering Apparatus 11C]

Next, operational effects achieved by the third electric power steering apparatus 11C will be described.

The first electric power steering apparatus 11A employs a configuration in which the steering sensor (steering angle detector) 26 is provided on the side of the turning wheels 41a, 41b relative to the steering torque sensor 25 (torsion bar portion 20), in order to remove the possibility of leading to the situation in which the steering direction of the steering wheel 13 and the turning direction of the turning wheels 41a, 41b are opposite to each other (do not match each other) in a case where the hysteresis characteristics related to the steering reaction force is set and the torsional rigidity of the torsion bar portion 20 is lower than the reference threshold value for maintaining stable running of the vehicle.

However, for example, due to layout constraints or the like, there is also assumed a case where it is not possible to employ the configuration of the first electric power steering apparatus 11A, and it cannot help employing a configuration in which the steering angle sensor (steering angle detector) 26 is provided on the side of the steering wheel (steering member) 13 relative to the steering torque sensor 25 (torsion bar portion 20). Also in such a case, it is strongly required to ensure comfort of the steering feeling and stabilization of the vehicle behavior.

From this aspect (a second aspect: corresponding to claim 2), as with the configuration of the first electric power steering apparatus 11A, the third electric power steering apparatus 11C includes the steering wheel (steering member) 13, the steering torque sensor (steering torque detector) 25, the steering angle sensor (steering angle detector) 26, the steering assist motor 27, and the drive control unit 63.

However, in the third electric power steering apparatus 11C, a position where the steering angle sensor (steering angle detector) 26 is provided is different from that in the first electric power steering apparatus 11A. That is, in the third electric power steering apparatus 11C, the steering angle sensor (steering angle detector) 26 is provided on the side of the steering wheel (steering member) 13 relative to the position where the steering torque sensor 25 (including the torsion bar portion 20) is provided on the steering shaft 19.

Further, in the third electric power steering apparatus 11C, the steering information processing unit 61 estimates the torsion angle of the steering shaft 19 (including the torsion bar portion 20) based on the detection result by the steering torque detector 25, and calculates the correction amount of the steering angle for compensating the torsion amount of the steering shaft 19 (including the torsion bar portion 20) based on the estimated torsion angle of the steering shaft 19 (including the torsion bar portion 20), and then calculates the steering angle after the correction for compensating the torsion amount of the steering shaft 19 (including the torsion bar portion 20) based on the steering angle detected by the steering angle detector 26 and the calculated correction amount of the steering angle.

Further, the drive control unit 63 includes the steering reaction force characteristics storage unit 65 for storing hysteresis characteristics related to the steering reaction force which is generated by driving the steering assist motor 27 and is associated with the change of the steering angle after the correction in the case where the steering angle is additionally changed or changed back, and performs drive control of the steering assist motor 27 based on the steering angle after the correction and the hysteresis characteristics stored in the steering reaction force characteristics storage unit 65.

According to the third electric power steering apparatus 11C based on the second aspect (corresponding to claim 2), the steering angle sensor (steering angle detector) 26 is provided on the side of the steering wheel (steering member) 13 relative to the position where the steering torque sensor 25 (including the torsion bar portion 20) is provided on the steering shaft 19, and the drive control unit 63 performs drive control of the steering assist motor 27 based on the steering angle after the correction and the hysteresis characteristics stored in the steering reaction force characteristics storage unit 65. Therefore, the steering reaction force having characteristics contributing to stability of the vehicle behavior is given even in the vicinity of the steering neutral position. As a result, it is possible to perform steering of the steering wheel (steering member) 13 with a comfortable steering feeling while stabilizing the vehicle behavior, even in a case where there is employed a configuration in which the steering angle sensor (steering angle detector) 26 is provided on the side of the steering wheel (steering member) 13 relative to the steering torque sensor 25 (torsion bar portion 20).

Further, the third electric power steering apparatus 11C may employ a configuration based on the third aspect.

According to the third electric power steering apparatus 11C based on the third aspect, since the steering reaction force which is associated with the case where the steering angle θh is in the neutral position is set to the value other than zero (for example, see FIG. 3), in particular, the steering feeling in the vicinity of the steering neutral position can be improved in addition to operational effects achieved by the third electric power steering apparatus 11C based on the second aspect.

Further, the third electric power steering apparatus 11C may employ a configuration based on the fourth aspect.

According to the third electric power steering apparatus 11C based on the fourth aspect, since the torsional rigidity of the torsion par portion 20 is set to high rigidity exceeding the reference threshold value for maintaining stable running of the vehicle, it is possible to reliably remove the possibility of leading to the situation in which the steering direction of the steering member 13 and the turning direction of the turning wheels 41a, 41b are opposite to each other (do not match each other). As a result, it is possible to perform steering of the steering member more accurately with a comfortable steering feeling while stabilizing the vehicle behavior.

Further, the third electric power steering apparatus 11C may employ a configuration based on the fifth aspect.

According to the third electric power steering apparatus 11C based on the fifth aspect, since the magnetostrictive torque sensor 25 is employed as the steering torque detector, the torsional rigidity of the torsion bar portion 20 can be set to be larger than that of, for example, the torque sensor of the torsion bar type. As a result, it is possible to achieve the effect of performing steering of the steering member at a high level with a comfortable steering feeling while stabilizing the vehicle behavior.

[Other Embodiments]

The plurality of embodiments described above show examples of realization of the present invention. Therefore, the technical scope of the present invention must not be interpreted restrictively by these embodiments. The present invention can be implemented in various embodiments without departing from the spirit or essential characteristics thereof.

For example, the embodiments of the present invention have been described with an example in which the steering angle sensor 26 is provided on the steering shaft 19, but the present invention is not limited to this example. There may be employed a configuration in which rotational position information (detected by a resolver built in the steering assist motor 27) of the steering assist motor 27 is converted to the steering angle of the steering wheel 13 to be used.

As described above, in a case where there is employed the configuration in which the rotational position information of the steering assist motor 27 is converted to the steering angle of the steering wheel 13 to be used, the steering angle sensor 26 may be omitted. In this case, depending on a rigidity of a reduction gear mechanism including the worm gear 29 and the worm wheel gear 31, an error (a torsion angle) inevitably occurs between a rotation angle of the steering shaft 19 and a rotation angle of the output shaft of the steering assist motor 27. Therefore, there has been a problem that the steering angle cannot be detected with a high accuracy.

To solve the problem, there may be employed a configuration in which the torsion angle generated depending on the rigidity of the reduction gear mechanism is estimated, and the correction amount of the steering angle for compensating the torsion amount is calculated based on the estimated torsion angle of the reduction gear mechanism, and then the steering angle after the correction for compensating the torsion amount of the reduction gear mechanism is calculated based on the steering angle based on the rotational position information of the steering assist motor 27 and the calculated correction amount of the steering angle.

Specifically, the steering angle $\theta g*2$ after the correction can be obtained by using the following equations.

$$\Delta\theta mg = Tm/Kw \quad \text{(Equation 3)}$$

$$\theta g*2 = (\theta m - \theta mg)/nM \quad \text{(Equation 4)}$$

Here, $\Delta\theta mg$ is the correction amount of the steering angle for compensating the torsion amount of the reduction gear mechanism. Tm is an output torque estimation value of the steering assist motor 27. Kw is a torsional rigidity of the reduction gear mechanism which can be obtained in advance. $\theta m$ is a detection value of the steering angle based on the rotational position information of the steering assist motor 27. nM is a reduction ratio of the reduction gear mechanism. Note that, the output torque estimation value Tm of the steering assist motor 27 may be appropriately estimated from a product of a motor current detection value flowing in the steering assist motor 27 and a torque constant, or the like.

Further, the embodiments of the present invention have been described with an example in which the assist force of the steering assist motor 27 is applied to the steering shaft 19, but the present invention is not limited to this example. There may be, for example, employed a configuration in which the assist force of the steering assist motor 27 is applied to the pinion shaft 35, or a configuration in which the assist force of the steering assist motor 27 is applied to the rack shaft 47.

What is claimed is:

1. An electric power steering apparatus comprising:
a steering member which is configured to be operated by a driver when turning a turning wheel of a vehicle;
a steering torque detector for detecting a steering torque which is inputted by the driver to a steering shaft attached to the steering member based on torsion information of a torsion bar portion constituting at least a part of the steering shaft;
a steering angle detector for detecting a steering angle of the steering member;
a steering assist motor for applying a steering assist force to the steering member via the steering shaft in order to adjust the steering torque inputted by the driver; and
a drive control unit for performing drive control of the steering assist motor based on at least the steering torque detected by the steering torque detector and the steering angle detected by the steering angle detector,
wherein the drive control unit includes a steering reaction force characteristics storage unit for storing hysteresis characteristics related to a steering reaction force which is generated by driving the steering assist motor and is associated with a change of the steering angle in a case where the steering angle is increased or decreased by steering the steering member, and performs drive control of the steering assist motor based on the steering angle and the hysteresis characteristics stored in the steering reaction force characteristics storage unit, and
wherein the steering angle detector is provided on a side of the turning wheel relative to a position where the steering torque detector is provided on the steering shaft.

2. An electric power steering apparatus comprising:
a steering member which is configured to be operated by a driver when turning a turning wheel of a vehicle;
a steering torque detector for detecting a steering torque which is inputted by the driver to a steering shaft attached to the steering member based on torsion information of a torsion bar portion constituting at least a part of the steering shaft;
a steering angle detector for detecting a steering angle of the steering member;
a steering assist motor for applying a steering assist force to the steering member via the steering shaft in order to adjust the steering torque inputted by the driver; and
a drive control unit for performing drive control of the steering assist motor based on at least the steering torque detected by the steering torque detector and the steering angle detected by the steering angle detector,
wherein the steering angle detector is provided on a side of the steering member relative to a position where the steering torque detector is provided on the steering shaft
wherein the electric power steering apparatus further comprises a steering information processing unit, which estimates a torsion angle of the steering shaft based on a detection result by the steering torque detector, and calculates a correction amount of the steering angle for compensating a torsion amount of the steering shaft based on the estimated torsion angle of the steering shaft, and then calculates a steering angle after a correction for compensating the torsion amount of the steering shaft based on the steering angle detected by the steering angle detector and the calculated correction amount of the steering angle, and
wherein the drive control unit includes a steering reaction force characteristics storage unit for storing hysteresis characteristics related to a steering reaction force which is generated by driving the steering assist motor and is associated with a change of the steering angle after the correction in a case where the steering angle is increased or decreased by steering the steering member, and performs drive control of the steering assist motor based on the steering angle after the correction and the hysteresis characteristics stored in the steering reaction force characteristics storage unit.

3. The electric power steering apparatus according to claim 1,
wherein in the hysteresis characteristics, the steering reaction force associated with a case where the steering angle is in a neutral position is set to a value other than zero.

4. The electric power steering apparatus according to claim 1,
wherein a torsional rigidity of the torsion bar portion is set to high rigidity exceeding a reference threshold value for maintaining stable running of the vehicle.

5. The electric power steering apparatus according to claim 1,
wherein the steering torque detector is composed of a magnetostrictive torque sensor which is provided on the torsion bar portion to detect the steering torque inputted by the driver without touching the torsion bar portion.

6. The electric power steering apparatus according to claim 2,
wherein in the hysteresis characteristics, the steering reaction force associated with a case where the steering angle is in a neutral position is set to a value other than zero.

7. The electric power steering apparatus according to claim 2,
wherein a torsional rigidity of the torsion bar portion is set to high rigidity exceeding a reference threshold value for maintaining stable running of the vehicle.

8. The electric power steering apparatus according to claim 3,
wherein a torsional rigidity of the torsion bar portion is set to high rigidity exceeding a reference threshold value for maintaining stable running of the vehicle.

9. The electric power steering apparatus according to claim 6,
wherein a torsional rigidity of the torsion bar portion is set to high rigidity exceeding a reference threshold value for maintaining stable running of the vehicle.

10. The electric power steering apparatus according to claim 2,
wherein the steering torque detector is composed of a magnetostrictive torque sensor which is provided on the torsion bar portion to detect the steering torque inputted by the driver without touching the torsion bar portion.

11. The electric power steering apparatus according to claim 3,
wherein the steering torque detector is composed of a magnetostrictive torque sensor which is provided on the torsion bar portion to detect the steering torque inputted by the driver without touching the torsion bar portion.

12. The electric power steering apparatus according to claim 4,
wherein the steering torque detector is composed of a magnetostrictive torque sensor which is provided on the torsion bar portion to detect the steering torque inputted by the driver without touching the torsion bar portion.

13. The electric power steering apparatus according to claim 6,
wherein the steering torque detector is composed of a magnetostrictive torque sensor which is provided on the torsion bar portion to detect the steering torque inputted by the driver without touching the torsion bar portion.

14. The electric power steering apparatus according to claim 7,
wherein the steering torque detector is composed of a magnetostrictive torque sensor which is provided on the torsion bar portion to detect the steering torque inputted by the driver without touching the torsion bar portion.

15. The electric power steering apparatus according to claim 8,
wherein the steering torque detector is composed of a magnetostrictive torque sensor which is provided on the torsion bar portion to detect the steering torque inputted by the driver without touching the torsion bar portion.

16. The electric power steering apparatus according to claim 9,
wherein the steering torque detector is composed of a magnetostrictive torque sensor which is provided on the torsion bar portion to detect the steering torque inputted by the driver without touching the torsion bar portion.

* * * * *